United States Patent
Karmazyn et al.

(10) Patent No.: US 9,997,792 B2
(45) Date of Patent: Jun. 12, 2018

(54) CELL VOLTAGE MONITORING CONNECTOR SYSTEM FOR A FUEL CELL STACK

(71) Applicant: INTELLIGENT ENERGY LIMITED, Loughborough, Leicestershire (GB)

(72) Inventors: Harry John Karmazyn, Loughborough (GB); John Frederick Clark, Loughborough (GB); Richard Albert Peart, Loughborough (GB); Mark Llewellyn Jones, Loughborough (GB)

(73) Assignee: Intelligent Energy Limited, Loughborough ( * ) Notice: Subject to any disclaimer, the term of this patent is extended or adjusted under 35 U.S.C. 154(b) by 392 days.

(21) Appl. No.: 14/345,921

(22) PCT Filed: Sep. 20, 2012

(86) PCT No.: PCT/GB2012/052326
§ 371 (c)(1),
(2) Date: Mar. 19, 2014

(87) PCT Pub. No.: WO2013/041869
PCT Pub. Date: Mar. 28, 2013

(65) Prior Publication Data
US 2014/0227625 A1 Aug. 14, 2014

(30) Foreign Application Priority Data
Sep. 21, 2011 (GB) .................................. 1116283.1

(51) Int. Cl.
*H01M 8/10* (2016.01)
*H01M 8/0276* (2016.01)
(Continued)

(52) U.S. Cl.
CPC ....... *H01M 8/0276* (2013.01); *H01M 8/0258* (2013.01); *H01M 8/0271* (2013.01);
(Continued)

(58) Field of Classification Search
CPC ............. H01M 8/0276; H01M 8/0271; H01M 8/0273; H01M 8/04552; H01M 8/242; H01M 8/2483; H01M 8/0258
See application file for complete search history.

(56) References Cited

U.S. PATENT DOCUMENTS 5,158,842 A * 10/1992 McHenry .............. H01M 2/266
429/161
2001/0008420 A1 7/2001 Opris
(Continued)

FOREIGN PATENT DOCUMENTS

EP 1296395 8/2012
JP 2004127779 4/2004

OTHER PUBLICATIONS

UK Intellectual Property Office Search Report dated Nov. 28, 2011, for priority application GB1116283.1.
(Continued)

*Primary Examiner* — Jimmy Vo
(74) *Attorney, Agent, or Firm* — Baker & Hostetler LLP

(57) ABSTRACT

An electrical connection system for cell voltage monitoring in a fuel cell stack. The fuel cell stack comprises a plurality of layers and a plurality of electrically conductive connection tabs extending outwardly from at least one face of the stack. The electrically conductive connection tabs are each formed as a laterally extending free portion of a flexible sealing gasket. Other portions of the gasket are disposed to provide sealing engagement between at least two layers of the fuel cell stack. By using the gasket material to form such electrical connection tabs, rather than flow plates, the con-
(Continued)

nection tabs are made flexible to make it easier to connect to standard arrays of connectors in connector assemblies.

11 Claims, 5 Drawing Sheets

(51) Int. Cl.
  *H01M 8/0258* (2016.01)
  *H01M 8/2483* (2016.01)
  *H01M 8/242* (2016.01)
  *H01M 8/0271* (2016.01)
  *H01M 8/0273* (2016.01)
  *H01M 8/04537* (2016.01)

(52) U.S. Cl.
  CPC ..... *H01M 8/0273* (2013.01); *H01M 8/04552* (2013.01); *H01M 8/242* (2013.01); *H01M 8/2483* (2016.02)

(56) References Cited

U.S. PATENT DOCUMENTS

| | | | |
|---|---|---|---|
| 2003/0013000 A1* | 1/2003 | Kuroki | H01M 8/0271 |
| | | | 429/431 |
| 2004/0018412 A1* | 1/2004 | Orsbon | H01M 8/0258 |
| | | | 429/434 |
| 2004/0214071 A1 | 10/2004 | Barnett et al. | |
| 2005/0191537 A1 | 9/2005 | Belchuk | |
| 2005/0213409 A1 | 9/2005 | Wakahoi | |

OTHER PUBLICATIONS

International Search Report and Written Opinion dated Feb. 27, 2013.
UK Intellectual Property Office Examination Report dated Oct. 17, 2013, for priority application GB1116283.1.

* cited by examiner

CELL VOLTAGE MONITORING CONNECTOR SYSTEM FOR A FUEL CELL STACK

REFERENCE TO RELATED APPLICATIONS

This application is a National Stage of International Application No. PCT/GB2012/052326, filed on Sep. 20, 2012, which claims priority to GB Application No. 1116283.1, filed on Sep. 21, 2011, the disclosures of which are incorporated by reference in their entirety.

The present invention relates to electrical connector systems used in fuel cell stacks to make electrical connections to a plurality of individual cells within a fuel cell stack.

Conventional electrochemical fuel cells convert fuel and oxidant into electrical and thermal energy and a reaction product. A typical fuel cell comprises a membrane-electrode assembly (MEA) sandwiched between an anode flow field plate and a cathode flow field plate. Gas diffusion layers may be disposed between each flow field plate and the MEA. Gaskets may be used to separate various layers and to provide requisite seals. The flow field plates typically include one or more channels extending over the surface of the plate adjacent to the MEA for delivery of fluid fuel or oxidant to the active surface of the MEA.

In a conventional fuel cell stack, a plurality of cells are stacked together, so that the anode flow field plate of one cell is adjacent to the cathode flow field plate of the next cell in the stack, and so on. In some arrangements, bipolar flow plates are used so that a single flow field plate has fluid flow channels in both sides of the plate. One side of the bipolar plate serves as an anode flow plate for a first cell and the other side of the flow plate serves as a cathode flow plate for the adjacent cell. Power can be extracted from the stack by electrical connections made to the first and last flow plate in the stack. A typical stack may comprise many tens or even hundreds of cells. The present invention is relevant to all of these various fuel cell stack constructions.

In many fuel cell stacks, it is important to be able monitor the voltage of individual cells in the stack. Thus, it is necessary to provide electrical connection to many (and often to all) of the flow plates in the stack. Conventionally, this has been achieved by providing electrical connector tabs to at least some of the flow plates in the stack. These cell voltage monitoring tabs extend from edges of the flow plates, laterally outward from the stack thereby forming an array of tabs along an edge face of the stack, so that individual electrical connectors may be coupled to each tab. One arrangement of cell voltage monitoring tabs extending from each flow plate is shown in FIG. 1.

The fuel cell stack 1 in FIG. 1 has a plurality of physically parallel cells 2 each of which has an anode flow plate with a respective tab 3 extending outwards from a face 4 of the fuel cell stack. To decrease the packing density of the tabs (i.e. to increase the separation of adjacent tabs) or to provide additional connection points to the same or different plates in the stack, the tabs 3 may be formed in two (or more) rows 5, 6.

These male tabs 3 can typically be used with standard female electrical connectors, such as blade receptacles well known in the art. Use of individual blade receptacles for each tab 3 is practical for manufacture of small stacks and small volumes of cells, but is not ideal for mass production of cells in view of the high labour content of connecting individual receptacles.

It would be desirable to use multi-way or multi-pole connectors to simultaneously connect to a number of tabs. Industry standard connectors have a predetermined pitch, e.g. based on dimensions of 0.1 inch or 2 mm or divisions/multiples thereof. In connecting to the tabs of fuel cell stacks, one potential problem is that the spacing (or pitch) of the fuel cells is determined by the compressed size of the various layered components discussed above, and this might not match a standard connector pitch. Another problem can be that standard connectors may have a positional accuracy for each terminal, for example ±0.2 mm, and this level of precision might not be appropriate to the variation in tab spacing in many fuel cell designs.

Thus, a multi-way receptacle connector (i.e. a unitary connector that simultaneously engages with many tabs) can be difficult to implement in a fuel cell stack.

It is an object of the present invention to overcome or mitigate some or all of these problems.

According to one aspect, the present invention provides a fuel cell stack comprising a plurality of layers and a plurality of electrically conductive connection tabs extending outwardly from at least one face of the stack, the electrically conductive connection tabs each being formed as a laterally extending free portion of a flexible sealing gasket, other portions of the gasket being disposed to provide sealing engagement between at least two layers of the fuel cell stack.

Each said gasket may comprise a manifold gasket disposed laterally adjacent to a flow field plate. Each said gasket may be disposed between a membrane-electrode assembly of the fuel cell and an electrode plate. Each said gasket may be disposed between a cathode electrode and an anode electrode. A first portion of each gasket may be electrically insulating and a second portion of the gasket that is in contact with an adjacent electrode may be electrically conductive and in electrical contact with the electrically conductive connection tab. The connection tab may be integrally formed with the rest of the gasket. The gasket may be formed from a material that imparts electrical conductivity to the bulk of the gasket material. At least a portion of the gasket including the connection tab may have an electrically conductive layer formed on at least one surface thereof. The connection tab may have a resistance in the range 10 ohms to 1000 ohms. Each connection tab may extend outwardly from a side face of the fuel cell stack so as to form at least one row of connection tabs along the side face. The fuel cell stack may include a tab guide comprising a plurality of channels, each channel having received therein a respective one of the connection tabs, the channels being configured to fan the connection tabs from a first spacing at a proximal end of the connection tabs to a second spacing at a distal end of the connection tabs. The fuel cell stack may include an electrical connector assembly coupled to the connection tabs in the tab guide, at their distal ends. The fuel cell stack may include an electrical connector assembly coupled to the row of connection tabs. Selected ones of the connection tabs may have a different electrical resistance to other ones of said connection tabs.

Embodiments of the invention will now be described by way of example and with reference to the accompanying drawings in which.

Figure 2:
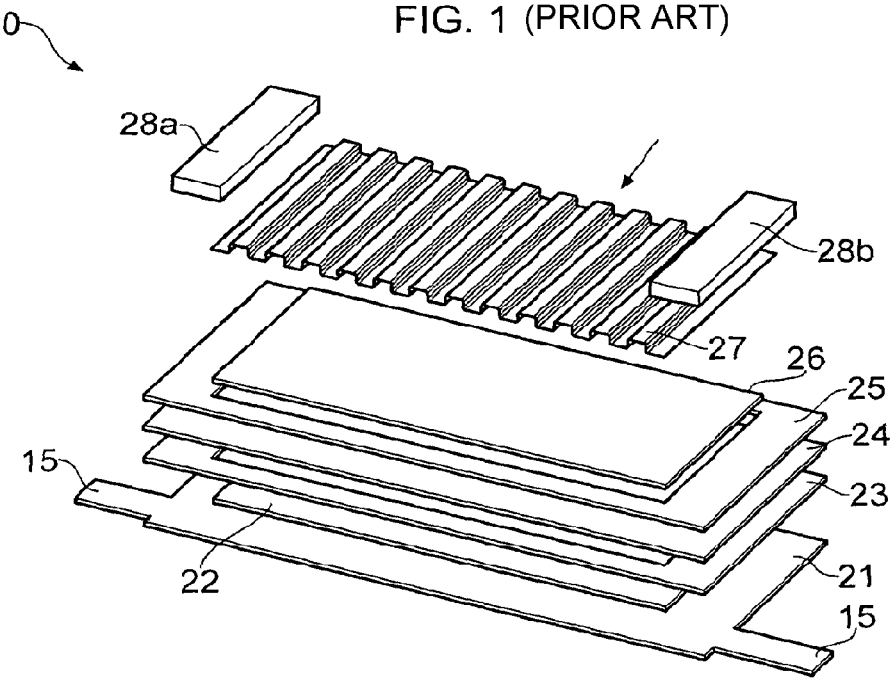
FIG. 2 is a perspective exploded view of components of a fuel cell showing schematically the disposition of flow plates, gaskets and membrane electrode assembly.

FIG. 2 shows a schematic diagram of components of a fuel cell for an open cathode type fuel cell stack in exploded form for clarity. Each cell 20 includes an anode flow plate 21, an anode gasket 23, a membrane-electrode assembly (MEA) 24, a cathode gasket 25 and a cathode flow plate 27. The anode gasket 23 provides a fluid tight seal between the anode flow plate 21 and the MEA 24 and defines a frame around an anode diffuser 22. Similarly, the cathode gasket 25 provides a fluid tight seal between the cathode flow plate 27 and the MEA 24 and defines a frame around a cathode diffuser 26. In the particular arrangement of FIG. 2, the cathode flow plate is provided as a corrugated cathode separator plate 27 and a pair of manifold gaskets 28a, 28b are provided at each end thereof.

In other arrangements, the fuel cell could be a closed cathode system, for example in which the cathode flow plate could be a flat plate with channels extending in a surface thereof. In other arrangements, the cathode flow plate of one cell could be combined with the anode flow plate of an adjacent cell as a bipolar plate.

In the design of fuel cell shown in FIG. 2, the anode flow plate 21 includes exemplary electrical connection tabs 15 (e.g. cell voltage monitoring tabs) each extending laterally outward from an edge of the flow plate 21. These tabs would have a rigidity and spacing determined by the structure and position of the anode flow plate. The potential disadvantages of such tabs have been discussed above.

In the present invention, it has been recognised that the gaskets used in fuel cells such as that described in connection with FIG. 2 can be modified to provide tab electrical connectors on the gaskets instead of the tabs currently provided on the anode, cathode or bipolar electrode plates exemplified by tabs 15 provided on the anode flow plate 21 in FIG. 2.

Figure 3:
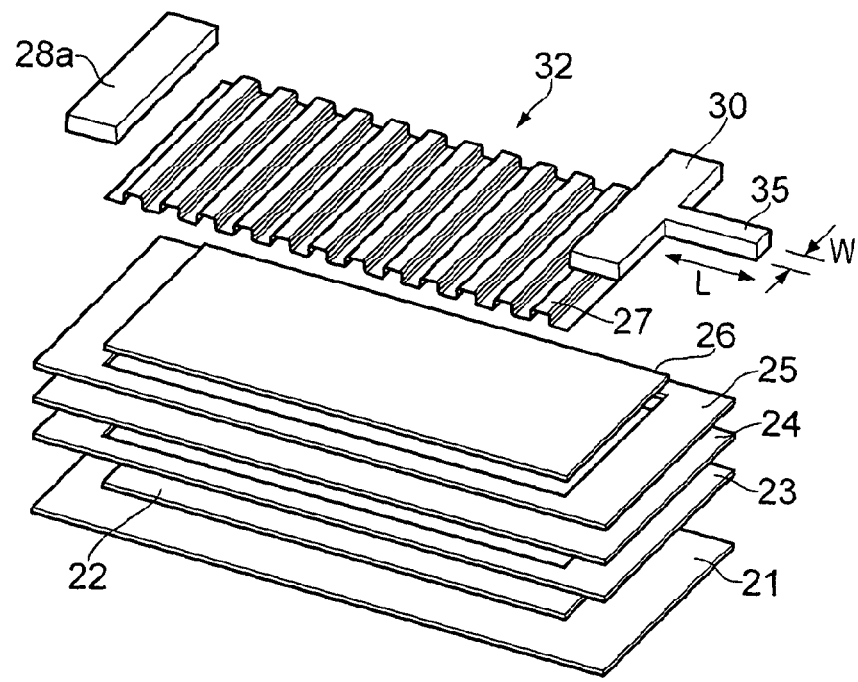
FIG. 3 is a perspective exploded view of components of a fuel cell showing schematically the disposition of flow plates, gaskets and membrane electrode assembly incorporating a manifold gasket with a connection tab extending laterally outward therefrom.

FIG. 3 shows a schematic diagram of components of a fuel cell 32 similar to that of FIG. 2, but with a modified manifold gasket 30 including an electrical connection tab 35 (e.g. a cell voltage monitoring tab) formed on or formed as an integral part of the manifold gasket 30. The gasket 30 comprises an elastomeric or other compressible and flexible material suitable for providing a fluid tight seal against the cathode separator plate 27 and against an adjacent cathode gasket 25 and against an adjacent anode plate from the next cell (not shown in FIG. 3). The gasket 30 should be sufficiently compressible so as to absorb any minor variations in thickness of the adjacent components and to absorb any distortion in the fuel cell stack assembly while maintaining an adequate fluid seal against adjacent components. The gasket 30 may also define apertures (not shown) for allowing fluid flow in galleries extending through the depth of the stack.

The gasket 30 and electrical connection tab 35 are formed from an electrically conductive material and the connection tab 35 extends laterally outward beyond the main, generally rectangular, perimeter of the fuel cell such that it will extend outwardly from a face of the fuel cell stack when multiple cells are constructed into a stack. Thus, the length L of the connection tab 35 is sufficiently long that it extends beyond the perimeter of an adjacent anode flow plate 21 (and beyond the perimeter of the MEA 24 and any other flow plates and gasket arrangements).

In a general aspect, the gasket 30 includes an electrically conductive connection tab 35 that extends laterally outward beyond the perimeter of the fuel cell 32 such that when the cell is incorporated into a fuel cell stack, the connection tab provides a laterally extending free portion of a flexible sealing gasket. Other portions of the gasket are disposed to provide sealing engagement between layers of the fuel cell stack. The portion of the connection tab 35 immediately adjacent to the main body of the gasket 30 will be referred to hereinafter as the "proximal end" and the portion of the connection tab furthest from the main body of the gasket will be referred to hereinafter as the "distal end". The expression "tab" or "free portion" of the gasket is intended to encompass any form of projection from the general line of the gasket perimeter edge suitable for projection from the face of a fuel cell stack into which the gasket is incorporated such that it can be received into a connector assembly.

The connection tab 35 is preferably fabricated together with the other features of the gasket by stamping out the required gasket shape from a sheet of suitable material. In other words, the connection tab 35 is preferably integrally formed with the gasket. Thus, in this case, the tab thickness will be equal to the thickness of the gasket sheet. The connection tab width W can be made to any suitable width as required for connection purposes or conductivity purposes as discussed hereinafter.

In the example shown, the entire gasket 30 and tab 35 can be formed from electrically conductive material. This is because the adjacent components (cathode separator plate 27 and anode flow plate 21 of the adjacent cell) have electrical continuity and the other adjacent component (cathode gasket 25) can be electrically insulating. Thus, there is no problem with the gasket 30 being entirely electrically conducting. The tab 35 therefore has electrical continuity with the necessary electrically conductive parts of the fuel cell. The gasket 30, and in particular the connection tab part 35 of the gasket 30 must be sufficiently electrically conducting for the tab to be able to function as a cell voltage monitoring tab.

Thus, the entire gasket 30 can be formed from an electrically conductive compressible material such as an elastomer that has been treated with an electrically conductive material. The electrically conductive material could be distributed throughout the gasket material such that the gasket is electrically conductive throughout its bulk. The electrically conductive material could be disposed as a film or surface layer on the gasket such that only one or both surfaces of the gasket material are electrically conductive. In principle, it would only be necessary for the surface facing the anode flow plate 21 of the adjacent cell, or the surface contacting the separator plate 27 to be electrically conductive.

Figure 4:
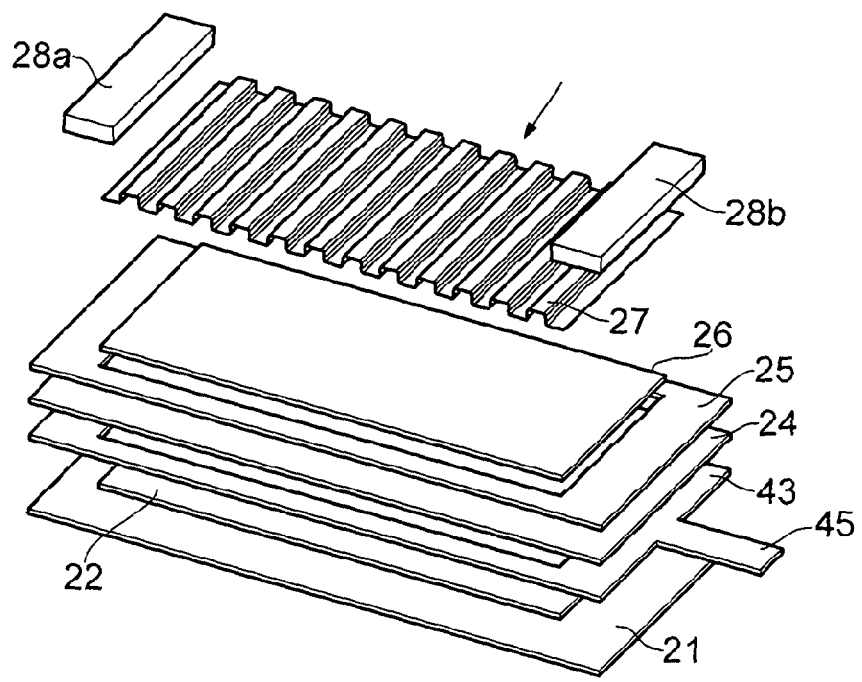
FIG. 4 is a perspective exploded view of components of a fuel cell showing schematically the disposition of flow plates, gaskets and membrane electrode assembly incorporating an anode gasket with a connection tab extending laterally outward therefrom.

A connection tab as described above may be provided on different gaskets than the example shown in FIG. 3. FIG. 4 shows a modified anode gasket 43 in which a cell voltage monitoring tab 45 is formed on the anode gasket 43. The anode gasket 43 comprises an elastomeric or other compressible and flexible material suitable for providing a fluid tight seal against the anode flow plate 21 and against the adjacent MEA 23. As shown in more detail in FIG. 5, the tabbed anode gasket 43 defines a frame 40 around a central aperture 41 into which may be received the anode diffuser 22. The gasket 43 should be sufficiently compressible so as to absorb any minor variations in thickness of the adjacent components and to absorb any distortion in the fuel cell stack assembly while maintaining an adequate fluid seal to contain anode fuel. The gasket 43 may also define apertures (not shown) for allowing fluid flow in galleries extending through the depth of the stack.

The gasket 43 and electrical connection tab 45 are formed from electrically conductive material and the connection tab 45 extends laterally outward beyond the main, generally rectangular, perimeter of the gasket 43. The length L of the connection tab 35 is sufficiently long that it extends beyond the perimeter of the adjacent anode flow plate 21 (and beyond the perimeter of the MEA 24). It will be understood, therefore, that if the gasket 43 has an outer perimeter that is coterminous with the anode flow plate 21 (at least along the gasket edge 42 as shown), then the length L of the connection tab need only be long enough to form an electrical connection thereto, using any one of various techniques that are exemplified hereinafter. If the gasket 43 area is somewhat smaller than the anode flow plate 21 (i.e. so that the edge 42 of the gasket is somewhat recessive compared to the flow plate 21), then the length L must be sufficient to extend out of the face of the fuel cell stack of which the cells 20 form a part.

In a general aspect, the gasket 43 includes an electrically conductive connection tab 45 that extends laterally outward beyond the perimeter of the anode plate 21 such that when the cell is incorporated into a fuel cell stack, the connection tab provides a laterally extending free portion of a flexible sealing gasket. Other portions of the gasket are disposed to provide sealing engagement between other layers of the fuel cell stack. Other aspects of the tab may be exactly as described in connection with FIG. 3.

The connection tab 45 is preferably fabricated together with the other features of the gasket (e.g. central aperture 41) by stamping out the required gasket shape from a sheet of suitable material. In other words, the connection tab 45 is preferably integrally formed with the gasket. Thus, in this case, the tab thickness will be equal to the thickness of the gasket sheet. The connection tab width W can be made to any suitable width as required for connection purposes or conductivity purposes as discussed hereinafter.

Figure 5:
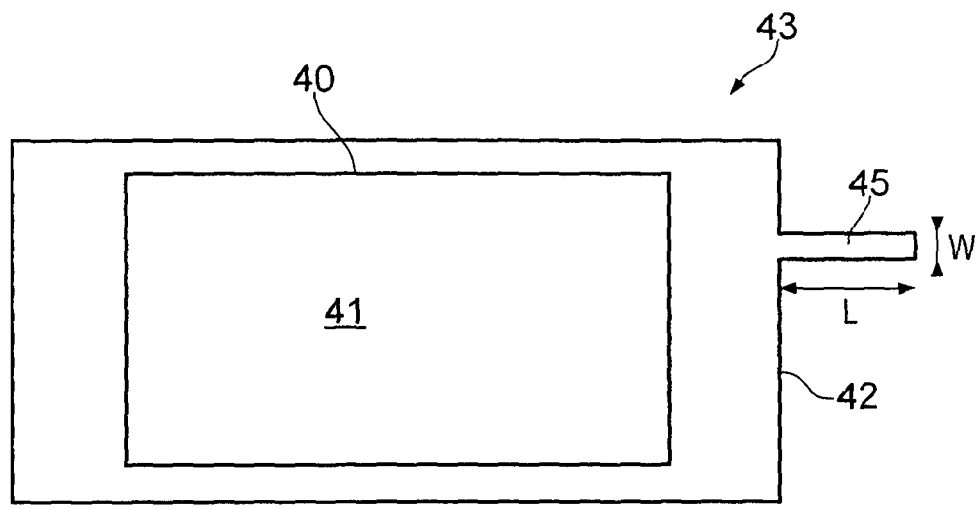
FIG. 5 is a schematic plan view of a portion of an anode gasket having a connection tab extending laterally outward therefrom.
Figure 6:
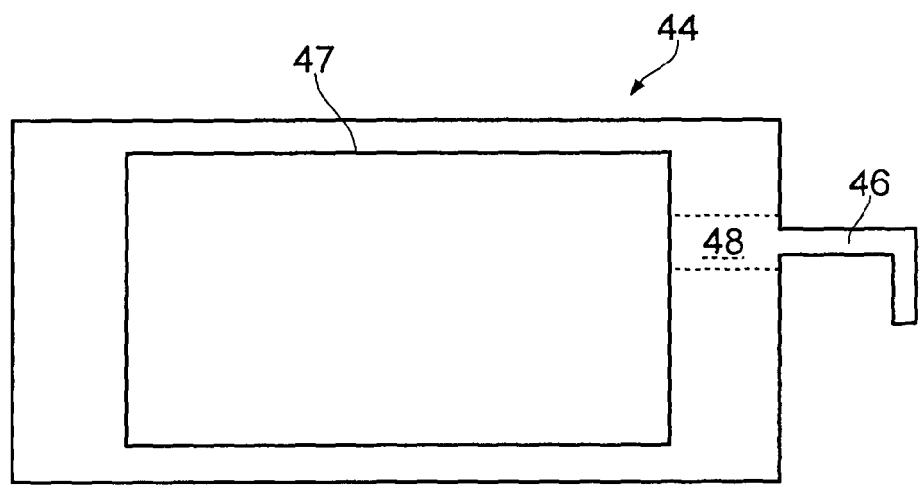
FIG. 6 is a schematic plan view of a portion of an anode gasket having an alternative configuration of connection tab extending laterally outward therefrom.

Other configurations of connection tab can be used, such as a right angle bend tab 46 as shown in the gasket 44 of FIG. 6. Other features of the gasket 44 correspond to those already described in connection with FIG. 5 or FIG. 3.

The connection tabs 35, 45, 46 could alternatively be attached to a pre-formed gasket.

As discussed earlier, connection tabs 35, 45, 46 of the gaskets 30, 43, 44 must include sufficiently electrically conductive material to be able to function as a cell voltage monitoring tab. The tab must also have electrical continuity with at least a portion of the gasket that comes into contact with the electrically conductive parts of the fuel cell, so as to provide an electrical current path from the cell. In the examples of FIGS. 4 to 6, this electrically conductive part of the fuel cell could be the anode plate 21.

The entire gasket could be formed from the electrically conductive compressible material distributed throughout the gasket material or the electrically conductive material could be disposed as a film or surface layer on, for example, the lower surface of the gasket that lies adjacent to the anode plate 21. In principle, it would only be necessary for a surface contacting an anode flow plate 21, or cathode flow plate, or bipolar flow plate to be electrically conductive, as well as at least a surface of the tab.

If an entire gasket is formed from electrically conductive material, then care must be taken to prevent conduction of electricity either around a flow plate or around the MEA. If a gasket is formed from electrically insulating material, then the risk of an unwanted current path can be minimised. If only one face of the gasket material (e.g. that which is facing an appropriate flow plate) is electrically conductive, then the risk of an unwanted current paths can also be minimised.

In another arrangement, it might generally be desirable to reduce or minimise areas of the gasket 35, 43, 44 that are electrically conductive. In this example, generally depicted on the gasket 44 of FIG. 6, the gasket may be divided into a first portion 47 and a second portion 48. The first portion 47 may be electrically insulating and the second portion 48 may be electrically conductive. The second portion is in electrical communication with the connection tab 46. In this way, the second portion 48 can provide an electrical connection to, for example, the anode flow plate 21 and an electrically conductive path to the connection tab 46. The second portion 48 can be formed by treating the gasket material with a suitable electrically conductive material to locally define a conductive portion, either in the bulk of the gasket or only on one or both surfaces.

Although the first and second portions 47, 48 have been shown in connection with the embodiment of FIG. 6, it will be understood that the first and second portions can generally be applicable to the other forms of gasket described, e.g. in connection with that shown in FIGS. 3, 4 and 5.

The connection tabs 35, 45, 46 and conductive portions of the gasket are preferably highly conductive so as to provide minimal losses and measurement errors when sampling the voltage at the end of the tab 35, 45, 46. However, because the connection tabs are flexible, there may be an increased risk of two gasket connection tabs becoming shorted together during operation of the cell, for example if an electrical connection assembly coupled to the connection tabs 35, 45, 46 is removed from the cell stack whilst it is operating. Such an electrical short could cause current to flow that might damage a cell. Thus, in an alternative arrangement, the resistivity of the gasket material forming the second portion 48 and/or the connection tab 35, 45, 46 may be arranged to result in a connection tab having a resistance that prevents or inhibits cell damage in the event of a short circuit between tabs. A preferred range of connection tab resistance is between 10 to 1000 ohms.

Too high a resistance can result in measurement inaccuracies. Thus, an upper resistance value is preferably chosen so that cell voltage measurement is acceptably accurate, while a lower resistance value is chosen to prevent cell damage in the event of a short circuit. Exact values depend on the circuitry that is used to monitor the cell voltage.

Not all connection tabs in a stack need have the same resistance. It may be desirable to make some connection tabs with lower resistance for low measurement error, and other intervening connection tabs with higher resistance for short circuit protection. Lower resistance tabs could be formed by providing a metallic coating to the surface of the gasket 30, 43, 44 at the appropriate places. Some circuits draw low level power from the stack at selected cells, and these particular connection tabs may benefit from being of lower resistance. Any number of connection tabs could be provided, e.g. one or more per cell, or only every n cells, where n is an integer greater than 1.

Figure 1:
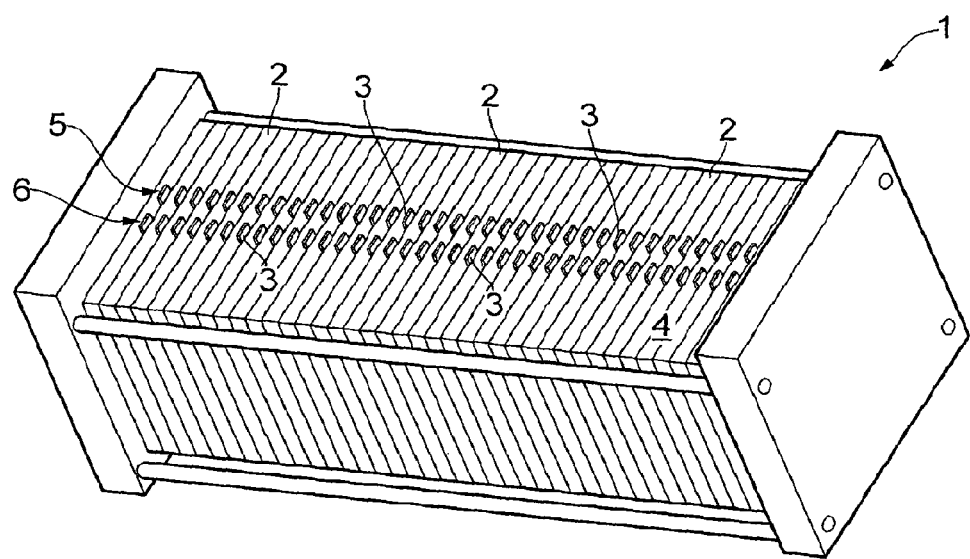
FIG. 1 is a perspective view of a fuel cell stack with a side face having an array of cell voltage monitoring electrical connection tabs extending out of the side face from each cell.

The connection tabs 35, 45, 46 could be formed in multiple locations on one or more edges of the fuel cell stack. The fuel cell stack could be constructed using gaskets of two types to form two or more rows of connection tabs 35, 45, 46 on a face of the stack, similar to the pattern shown for anode flow plate tabs in FIG. 1. The connection tabs of each row could be spaced every other cell, thus being configured with a spacing that is larger than the spacing between adjacent cells, the two rows being offset by one cell so as to facilitate a connection to every cell.

Figure 7:
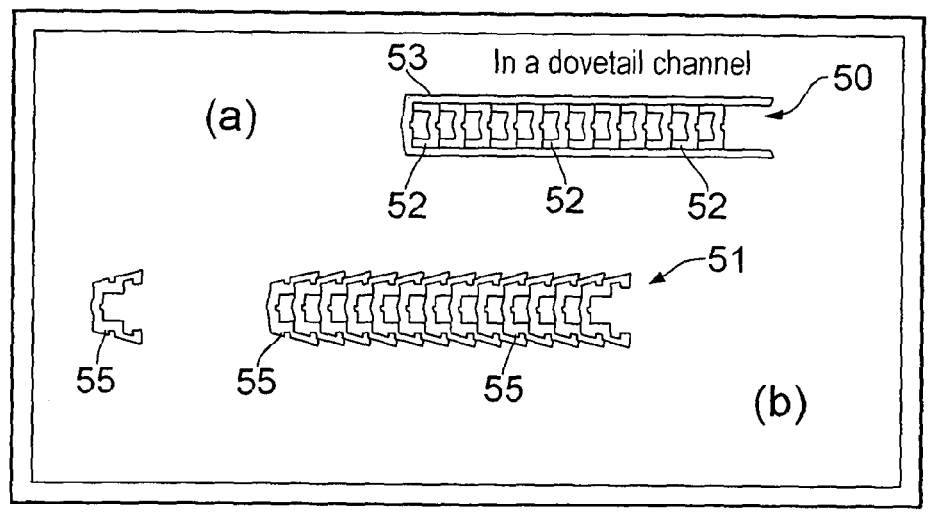
FIG. 7 is a schematic end view of an electrical connector assembly suitable for coupling to the gasket connection tabs.
Figure 8:
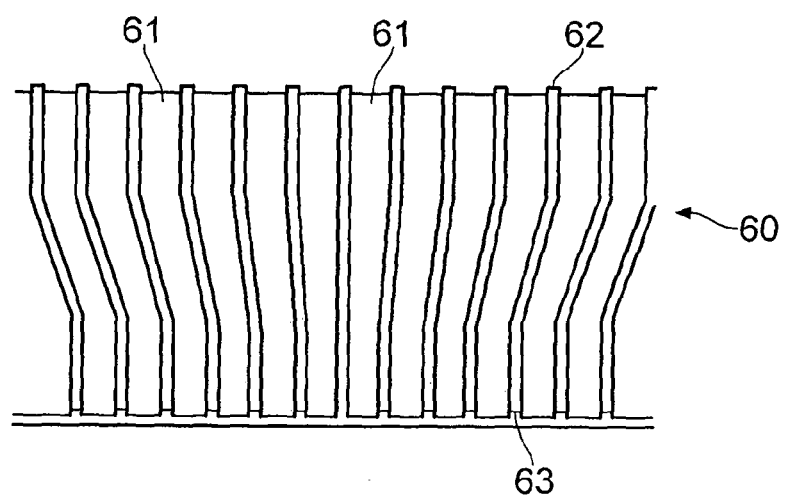
FIG. 8 is a plan view of a tab guide suitable for receiving the gasket connection tabs to modify the pitch thereof.
Figure 9:
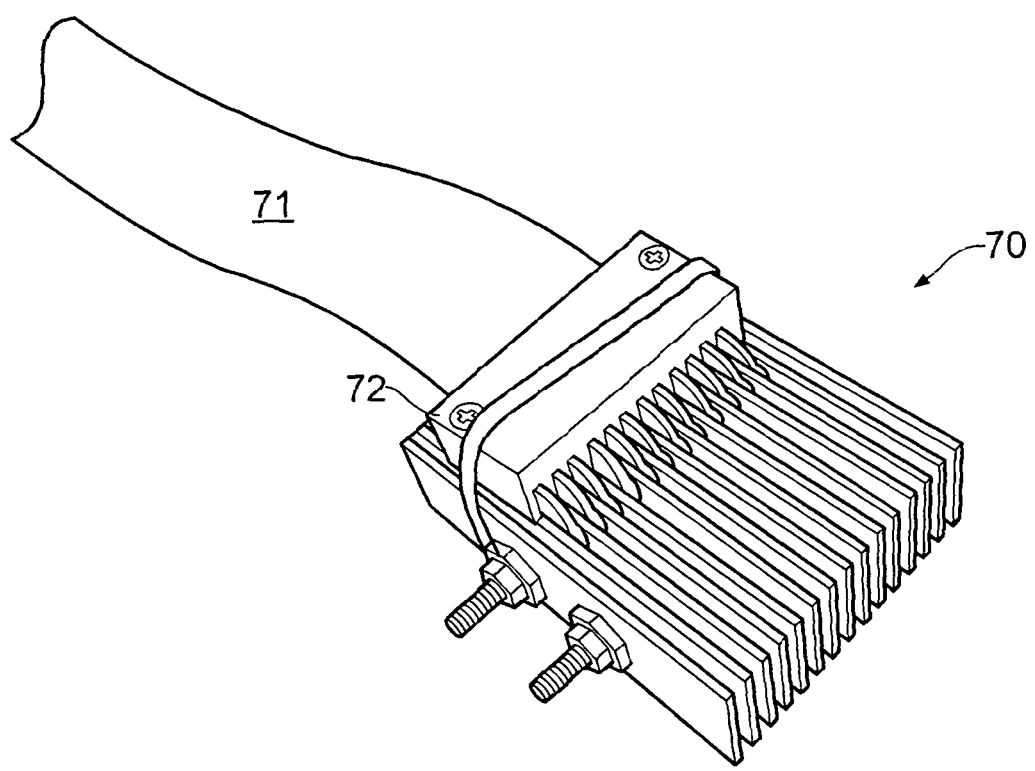
FIG. 9 is a perspective view of an electrical connection assembly for coupling the gasket connection tabs to a ribbon cable connector.

With reference to FIGS. 7, 8 and 9, we now describe various examples of electrical connector assemblies suitable for coupling to the gasket connection tabs. A desirable objective is to conform (i.e. flex) the connection tabs to a predetermined regular spacing, so as to allow their connection to a standard sized connector.

In a first arrangement, each connection tab is connected in to a respective element in a connector assembly of fixed pitch. This can be achieved as shown in FIG. 7a by sequentially capturing each successive connection tab into a respective element 52 of a serial clip. Each clip element 52 is located into a dovetail channel 53 to form a clip assembly 50. Alternatively, it can be achieved as shown in FIG. 7b by sequentially capturing each successive connection tab into a respective hermaphroditic clip element 55 which engage with each other in a stack to form a clip assembly 51. The flexibility of the gasket connection tabs means that any difference in pitch of, or spacing between, the gaskets 30, 43, 44 and the clip elements 52 or 55 can be absorbed by the flexibility of the gasket connection tabs, at least over a significant number of cells, e.g. 12 cells, for a single connector assembly.

In an alternative arrangement shown in FIG. 8, a tab guide 60 is used to adjust the pitch of, or spacing between, the gasket connection tabs from a first spacing at the proximal ends where they emerge from the stack face 4 to a second spacing at the distal ends. As seen in FIG. 8, the tab guide 60 comprises a set of channels 61 extending from a first edge 62 to a second edge 63. The pitch and spacing of the channels 61 changes from the first edge 62 to the second edge 63. Each successive gasket connection tab is introduced into successive channels 61 to guide the tabs from a first pitch to a second pitch. In one example, the first edge 62 is proximal to the point at which the tabs emerge from the side face 4 of the fuel cell stack 1 and the second edge 63 is distal to the point at which the tabs emerge from the side face 4 of the fuel cell stack 1. In such a case, the tab guide reduces the pitch of the tabs from a first value to a second value. In one example, the pitch of the tabs at their proximal ends in first edge 62 corresponds to the cell pitch of between 2.3 and 2.6 mm and the pitch of the tabs at their distal ends in second edge 63 corresponds to a standard connector pitch of 2 mm. In a typical example, 12 connection tabs are accommodated in a connector assembly for monitoring 11 cells, although this number and the dimensions are entirely exemplary. The tab guide 60 can be used to "fan in" (i.e. decrease the tab spacing) or "fan out" (i.e. increase the tab spacing).

In a preferred arrangement, the tab guide 60 is laid flat along the face 4 of the stack with the channels 61 facing up. The first edge 62 is aligned with the points where the gasket connection tabs emerge from the stack face 4. Each gasket connection tab is bent through 90 degrees so that it is parallel to the face 4 of the stack and is laid into a respective channel 61. The channels 61 may be flared at the first edge 62 to make this easier. With reference to FIG. 9, a flexible flat cable 71 is then used to make contact with the gasket connection tabs near or at the second edge 63 and a clamp 72 is used to press the cable 71 against the gasket connection tabs. The clamp 72 may be a screw clamp as shown or any other suitable clamp such as a toggle clamp or cam-based clamp. A connector assembly 70 is thereby formed.

Many variations to the embodiments described can be made. Gasket connection tabs could be formed on each and every gasket, including both anode gaskets 23 and cathode gaskets 25, or manifold gaskets 28a, 28b or could be formed on only selected ones of the anode and/or cathode and/or manifold gaskets. The connection tabs can emerge from any suitable edge of the gaskets, and may be formed on multiple edges for maximum flexibility in forming connections. Unwanted gasket tabs at the time of assembling a fuel cell stack could be severed from the gasket.

The gasket connection tabs 35, 45, 46 can be made of any suitable width W to provide adequate conductance along the tab, taking into account the bulk or surface conductivity of the gasket material and the thickness of the gasket material. The gasket connection tabs can be used as cell voltage monitoring tabs having a very low current requirement, or can be used for other purposes in extracting current from one or more cells within a stack (e.g. providing a low voltage, low current output for a specific circuit). Higher current requirements could, for example, be provided with a metallic layer deposited or otherwise formed on the surface of a gasket to form the tab 35, 45, 46 and, if applicable, the second portion 48.

The flexibility of the gasket connection tabs 35, 45, 46 allows considerable flexibility in adapting rows or part rows of tabs to any suitable standard connector assembly pitch, e.g. 1 mm, 2 mm, 0.1 inch, etc.

The gasket connection tabs described can form part of any suitable intra-cell gasket as exemplified above, or could even form part of any inter-cell gasket, e.g. a gasket residing between individual cells, such as between the anode flow plate and cathode flow plate of adjacent cells.

Other embodiments are intentionally within the scope of the accompanying claims.

The invention claimed is:
1. A fuel cell stack comprising
   a plurality of layers, and
   a plurality of electrically conductive connection tabs extending outwardly from at least one face of the stack,
   the electrically conductive connection tabs each being formed as a laterally extending free portion of one of a plurality of flexible sealing gaskets, each of the gaskets formed from a sheet having a thickness and comprising a frame portion that surrounds a central aperture;
   other portions of each of the gaskets being disposed between at least two layers of the plurality of layers of the fuel cell stack to provide sealing engagement,
   wherein electrically conductive material is distributed throughout a first portion of each of the gaskets such that the first portion of each of the gaskets is electrically conductive throughout the bulk of the first portion of each of the gaskets;
   wherein the first portion of each of the gaskets comprises the electrically conductive connection tabs of each gaskets and a first region of the frame portion adjacent to the central aperture through the full thickness of each of the gaskets;

wherein a second portion of each of the gaskets comprises a second region of the frame portion and comprises electrically insulating material.

2. The fuel cell stack of claim 1 in which each of the gaskets comprises a manifold gasket disposed laterally adjacent to a flow field plate.

3. The fuel cell stack of claim 1 in which each of the gaskets is disposed between a membrane-electrode assembly of the fuel cell and an electrode plate.

4. The fuel cell stack of claim 1 in which each of the gaskets is disposed between a cathode electrode and an anode electrode.

5. The fuel cell stack of claim 1 in which the connection tabs are integrally formed with the rest of the gaskets.

6. The fuel cell stack of claim 1 in which the connection tabs have a resistance in the range 10 ohms to 1000 ohms.

7. The fuel cell stack of claim 1 in which each of the connection tabs extends outwardly from a side face of the fuel cell stack so as to form at least one row of connection tabs along the side face.

8. The fuel cell stack of claim 7 further including a tab guide comprising a plurality of channels, each channel having received therein a respective one of the connection tabs, the channels being configured to fan the connection tabs from a first spacing at a proximal end of the connection tabs to a second spacing at a distal end of the connection tabs.

9. The fuel cell stack of claim 8 further including an electrical connector assembly coupled to the connection tabs in the tab guide, at their distal ends.

10. The fuel cell stack of claim 7 further including an electrical connector assembly coupled to the row of connection tabs.

11. The fuel cell stack of claim 7 in which selected ones of said connection tabs have a different electrical resistance to other ones of said connection tabs.

* * * * *